C. F. JENKINS.
DEVICE FOR ACCUMULATING WAVE POWER.
APPLICATION FILED OCT. 1, 1918.
1,294,808. Patented Feb. 18, 1919.
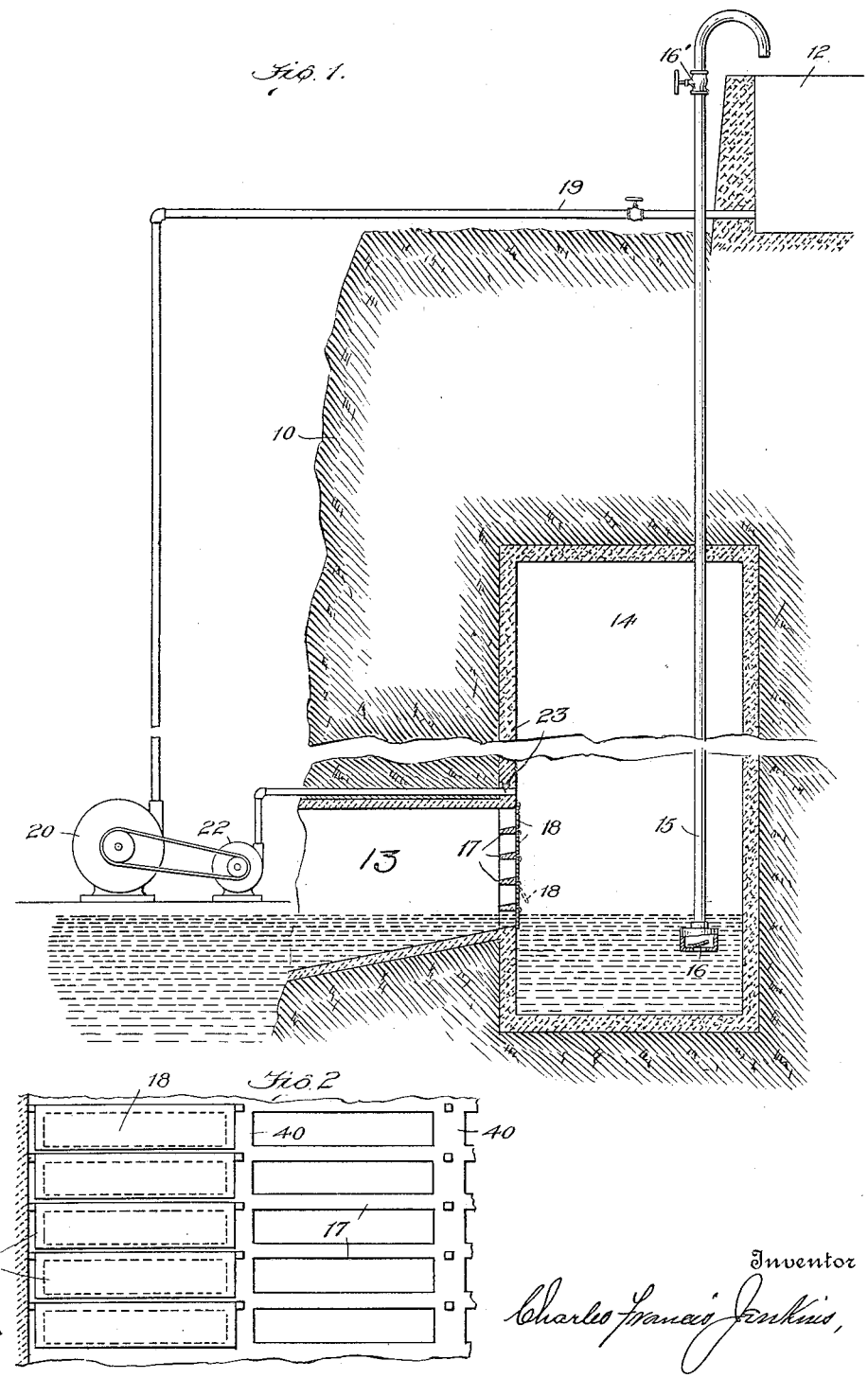

UNITED STATES PATENT OFFICE.

CHARLES FRANCIS JENKINS, OF WASHINGTON, DISTRICT OF COLUMBIA.

DEVICE FOR ACCUMULATING WAVE-POWER.

1,294,808.  Specification of Letters Patent.  Patented Feb. 18, 1919.

Application filed October 1, 1918. Serial No. 256,414.

*To all whom it may concern:*

Be it known that I, CHARLES FRANCIS JENKINS, a citizen of the United States, and resident of Washington, in the District of Columbia, have invented certain new and useful Improvements in Devices for Accumulating Wave-Power, of which the following is a specification, reference being had therein to the accompanying drawing.

The object of this invention is to accumulate the power of water waves, and this object is accomplished by employing wave force for direct compression of air which then gradually lifts a relatively small amount of water to a higher level so that its head may be available at any time for doing work.

In the accompanying drawings,

Figure 1 is a diagrammatic view showing in section a precipitous shore with my devices installed.

Fig. 2 shows a part of the same devices looking to the left in Fig. 1.

In the drawings, 10 represents a bluff, preferably of rock, rising abruptly from the sea 11, and 12 a reservoir upon the top of the bluff. From a horizontal line below the sea level and extending for any desired distance along the shore, a passage 13 is extended obliquely upward into the face of the bluff, the vertical height of the passage being such that its upper side is materially above sea level. At the inner end of the passage 13 is formed a large chamber 14 extending preferably from a point below the inner end of the passage to a point far above sea level. From a point near the plane of the lower side of the inner end of the passage 13 and preferably below that plane a pipe 15 extends upward and discharges into the reservoir 12, the pipe having at its lower end an upwardly opening check valve 16 and, preferably, a hand operated valve 16' at a higher point.

Both the passage and the chamber are preferably lined with cement 30 so that the walls may be impervious to air and water. At the inner end of the passage are fixed spaced horizontal bars 17 and the intermediate narrow elongated spaces are normally closed by inwardly opening check valves 18. From the bottom of the reservoir 12 a valved pipe 19 extends down to a turbine 20 at any convenient point near the sea level.

That portion of the chamber 14 below the plane of the passage 13 forms a sort of sand trap protecting the valve 16. In order that the check valves 18 may not be undesirably long, the broad passage 13 may be vertically divided by partitions 40 against which the ends of the valves 18 abut, there being thus a plurality of sets of valves. It is not essential that the check valve construction be that set forth for illustration.

In operation, the waves enter the passage 13 and moving along its rising floor strike the valves 18 with such momentum as the water may have, opening momentarily such valves as are strongly enough pressed, and allowing water to enter. The entering water compresses the air in the chamber 14 to an extent corresponding to the volume of entering water. Repeated impact of waves increases the compression until the water in the chamber, owing to the pressure upon it, rises and enters the reservoir 12. This continues indefinitely, or until valve 16' in the delivery pipe is manually closed. The height to which water can be forced is limited only by the striking force of the waves, and water will be forced up into the reservoir whenever even an occasional wave has momentum enough to force water through any of the valves 18, and obviously the accumulation of water at the high level is limited only by the size of the reservoir, if there be no use of power, leakage or evaporation, the accumulation going on with no limit as to time.

It is well known that when air under pressure rests upon water, the water gradually absorbs the air, and to counteract this action I provide any suitable means for supplying air to the chamber 12, for example, a small pump 22 to force air through a pipe 23 into the chamber. By having the passage 13 upwardly inclined, water below the plane of the valves is deflected upwardly against them, and another advantage is that little sand reaches the chamber.

Air in the chamber 14 is practically necessary since were the chamber filled with water or filled far above the valves 18 no wave impact would open any valve, water acting like a solid in resisting sudden impact. But confined air is compressed under sudden impact and then seeks with practically equal force to expand to its former volume. The operation of the apparatus depends upon storing air, which can be instantly compressed by the force of hammer blows momentarily exerted, and then allowing this force to be slowly used in moving a water column upon which hammer blows would have no useful effect. Obviously, the selection of a bluff or cliff instead of a low shore merely saves cost in providing a strong pressure chamber and a large storage reservoir of such elevation as to give the desired head for the stored water. This head will naturally depend upon the rapidity with which waves at the point selected advance, ordinarily. On most seacoasts, there are, during a part of each day waves such that a body of water extending out to a long distance from the shore line advances very rapidly and when suddenly arrested by meeting a vertical surface exerts for an instant the great force constituting what is known as "water hammer" in pipes, a force that often quickly breaks up the strongest of stranded ships.

It may be noted that the check valves momentarily opened by the advancing body of water, the pipe chambers and reservoirs, may be of any type and may be multiplied to any extent desired, there being practically unlimited suitable coast.

It may also be mentioned that the construction is such that even with nearly the maximum air compression in the chamber 14 some of the valves 18 will not be far below the water level in the chamber and so will be opened by wave impact.

What I claim is:

1. In apparatus of the class described, the combination with a compressed air chamber, of a passage leading into said chamber and open to receive incoming waves of water, a check valve located in said passage in position to receive the impact of incoming water and to allow it to enter the chamber and prevent its return, a reservoir at a higher level than the chamber, a conduit leading from the chamber to the reservoir, and a check valve allowing water to pass, in the conduit, toward said reservoir and preventing its return.

2. The combination with an elevated water reservoir, of a compressed air chamber at a lower level and having an inwardly opening check valve in position to be struck by waves upon a body of water, a conduit leading from said chamber to said reservoir, and a check valve in said conduit allowing water to pass therein outwardly only from the chamber.

3. The combination with an elevated water reservoir, of a compressed air chamber at a lower level and having an inwardly opening check valve in position to be struck by waves upon a body of water, a conduit leading from said chamber to said reservoir, a check valve in said conduit allowing water to pass outwardly from the chamber while preventing its return thereto, and means for forcing air into said chamber to replace that absorbed by the water therein.

4. The combination with an elevated water reservoir near the sea's coast line, of a compressed air chamber having inwardly opening check valves in position to receive the impact of many waves reaching the shore at this point, a conduit leading from said chamber to said reservoir, a check valve in said conduit, a water motor far below said reservoir and a valve-controlled pipe leading from the reservoir to the motor.

5. The combination with a compressed air chamber alongside a seacoast, a broad passage extending along the coast line, leading to said chamber, and subdivided into many small channels, check valves normally closing said channels and in position to be inwardly opened by wave impact, an elevated water reservoir, a pipe leading from the lower part of said chamber to said reservoir and provided with a check valve to allow water to pass from the chamber while barring its return.

6. The combination with a compressed air chamber in proximity to the sea's coast line and extending above and below the sea level, of a passage partly above the normal sea level, and leading from the sea into said chamber, inwardly opening check valves normally closing said passage, an elevated water reservoir, and a pipe provided with an upwardly opening check valve and leading from a point below the water level in said chamber to said reservoir.

In testimony whereof I hereunto affix my signature.

CHARLES FRANCIS JENKINS.